United States Patent
Kim et al.

(10) Patent No.: US 9,177,725 B2
(45) Date of Patent: Nov. 3, 2015

(54) MULTILAYER CERAMIC ELECTRONIC COMPONENT HAVING INTERNAL ELECTRODE WITH NON-ELECTRODE REGIONS AND METHOD OF MANUFACTURING THE SAME

(71) Applicant: SAMSUNG ELECTRO-MECHANICS CO., LTD., Suwon, Gyunggi-do (KR)

(72) Inventors: Jong Han Kim, Gyunggi-do (KR); Min Gon Lee, Gyunggi-do (KR); Yoon Hee Lee, Gyunggi-do (KR); Seung Ho Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 191 days.

(21) Appl. No.: 13/891,923

(22) Filed: May 10, 2013

(65) Prior Publication Data
US 2014/0240898 A1  Aug. 28, 2014

(30) Foreign Application Priority Data
Feb. 28, 2013 (KR) .................. 10-2013-0022247

(51) Int. Cl.
*H01G 4/30* (2006.01)
*H01G 4/012* (2006.01)
*H01G 4/12* (2006.01)

(52) U.S. Cl.
CPC .............. *H01G 4/30* (2013.01); *H01G 4/012* (2013.01); *H01G 4/12* (2013.01)

(58) Field of Classification Search
CPC ........... H01G 4/30; H01G 4/012; H01G 4/12; H01G 4/008
See application file for complete search history.

(56) References Cited

U.S. PATENT DOCUMENTS

| | | | |
|---|---|---|---|
| 6,366,444 B1* | 4/2002 | Yagi | 361/321.2 |
| 6,606,238 B1* | 8/2003 | Nakamura et al. | 361/321.2 |
| 2004/0179326 A1* | 9/2004 | Hattori | 361/320 |
| 2006/0198078 A1* | 9/2006 | Miyauchi et al. | 361/305 |
| 2007/0074806 A1* | 4/2007 | Kojima et al. | 156/89.16 |
| 2011/0038097 A1* | 2/2011 | Matsuda et al. | 361/321.4 |
| 2011/0141652 A1* | 6/2011 | Chang et al. | 361/272 |
| 2012/0026642 A1* | 2/2012 | Kaneko et al. | 361/321.4 |
| 2012/0099241 A1* | 4/2012 | Chang et al. | 361/301.4 |
| 2013/0049532 A1* | 2/2013 | Kim et al. | 310/311 |
| 2013/0222973 A1* | 8/2013 | Wada et al. | 361/321.2 |
| 2013/0286539 A1* | 10/2013 | Kim et al. | 361/303 |
| 2014/0177133 A1* | 6/2014 | Lee et al. | 361/321.4 |

FOREIGN PATENT DOCUMENTS

| | | | |
|---|---|---|---|
| JP | 08055753 A | * | 2/1996 |
| JP | 11354374 A | * | 12/1999 |
| JP | 2005135821 A | * | 5/2005 |
| JP | 2007103453 A | * | 4/2007 |

* cited by examiner

*Primary Examiner* — David M Sinclair
(74) *Attorney, Agent, or Firm* — McDermott Will & Emery LLP

(57) ABSTRACT

There is provided a multilayer ceramic electronic component, including a ceramic body, and an internal electrode formed in the ceramic body and having a plurality of non-electrode regions formed therein, wherein in a cross section formed in length and thickness directions of the ceramic body, when a thickness of the internal electrode is Te, an area of the internal electrode is Ae, and an area of the plurality of non-electrode regions is Ao, $0.1\ \mu m \leq Te \leq 0.55\ \mu m$ and $3.2\% \leq Ao:Ae \leq 4.5\%$ are satisfied.

10 Claims, 3 Drawing Sheets

X-X'

"Z"

MULTILAYER CERAMIC ELECTRONIC COMPONENT HAVING INTERNAL ELECTRODE WITH NON-ELECTRODE REGIONS AND METHOD OF MANUFACTURING THE SAME

CROSS-REFERENCE TO RELATED APPLICATIONS

This application claims the priority of Korean Patent Application No. 10-2013-0022247 filed on Feb. 28, 2013, in the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same, and more particularly, to a multilayer ceramic electronic component having excellent reliability and a method of manufacturing the same.

2. Description of the Related Art

In general, electronic components using a ceramic material, such as capacitors, inductors, piezoelectric elements, varistors, thermistors, and the like, include a ceramic body formed of a ceramic material, internal electrodes formed within the ceramic body, and external electrodes mounted on external surfaces of the ceramic body so as to be connected to respective internal electrodes.

Among ceramic electronic components, a multilayer ceramic capacitor is configured to include a plurality of laminated dielectric layers, internal electrodes disposed to face each other, having the dielectric layer interposed therebetween, and external electrodes electrically connected to the internal electrodes.

Multilayer ceramic capacitors have been widely used as components in computers and mobile communications devices such as PDAs, mobile phones, and the like, due to advantages thereof such as miniaturization, high capacitance, ease of mounting, and the like.

Recently, in accordance with the tendency for high levels of performance and compactness of devices in the electrical appliance and electronics industries, demand for small, high-performance, and inexpensive electronic components has increased. In particular, with advances in high-speed CPUs and small, lightweight, digitalized, multi-functional devices, research and development aimed at implementing a multilayer ceramic capacitor having characteristics such as miniaturization, thinness, high capacity, low impedance in a high frequency domain, and the like, have been actively conducted.

In particular, due to the thinning of internal electrodes, levels of connectivity thereof may be problematic, a factor in reductions in reliability of the multilayer ceramic electronic components.

[Related Art Document]
Japanese Patent Laid-Open Publication No. 2001-311985

SUMMARY OF THE INVENTION

An aspect of the present invention provides a multilayer ceramic electronic component allowing for design capacity to be realized and preventing dielectric breakdown and the occurrence of cracking by controlling a particle size of a ceramic additive powder trapped in an internal electrode and a distribution of a region thereof to implement an amount of connectivity in an internal electrode of 98% or more.

According to an aspect of the present invention, there is provided a multilayer ceramic electronic component, including: a ceramic body; and an internal electrode formed in the ceramic body and having a plurality of non-electrode regions formed therein, wherein in a cross section formed in length and thickness directions of the ceramic body, when a thickness of the internal electrode is Te, an area of the internal electrode is Ae, and an area of the plurality of non-electrode regions is Ao, $0.1\ \mu m \leq Te \leq 0.55\ \mu m$ and $3.2\% \leq Ao:Ae \leq 4.5\%$ are satisfied.

The thickness Te of the internal electrode may be an average thickness of the internal electrode.

The non-electrode region may include a ceramic additive powder.

The ceramic additive powder may be the same material as that forming the ceramic body.

The non-electrode region may further include pores.

When a ratio of a length of a portion actually formed with the internal electrode to an entire length of the internal electrode is defined by connectivity C of the internal electrode, $98\% \leq C \leq 99.99\%$ may be satisfied.

According to an aspect of the present invention, there is provided a method of manufacturing a multilayer ceramic electronic component, including: preparing a conductive paste including a conductive metal powder and a ceramic additive powder and having a ratio of an average particle size between the ceramic additive powder and the conductive metal powder being 1:12 or less; forming an internal electrode on a ceramic green sheet using the conductive paste; laminating a plurality of the ceramic green sheet on which the internal electrode is formed; and forming a ceramic body by sintering a laminate in which the ceramic green sheets are laminated, wherein the ceramic body includes the internal electrode having a plurality of non-electrode regions formed therein, and on a cross section formed in length and thickness directions of the ceramic body, when an area of the internal electrode is Ae and an area of the plurality of non-electrode regions is Ao, $3.2\% \leq Ao:Ae \leq 4.5\%$ is satisfied.

A ratio of a weight of the ceramic additive powder to a weight of the conductive metal may be 24.3% or less.

The ceramic additive powder may be a ceramic additive.

The ceramic additive powder may include barium titanate or strontium titanate.

In a cross section formed in length and thickness directions of the ceramic body, when a ratio of a length of a portion actually formed with the internal electrode to an entire length of the internal electrode is defined by connectivity C of the internal electrode, $98\% \leq C \leq 99.99\%$ may be satisfied.

A thickness Te of the internal electrode may satisfy $0.1\ \mu m \leq Te \leq 0.55\ \mu m$.

The thickness Te of the internal electrode may be an average thickness of the internal electrode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Figure 1:
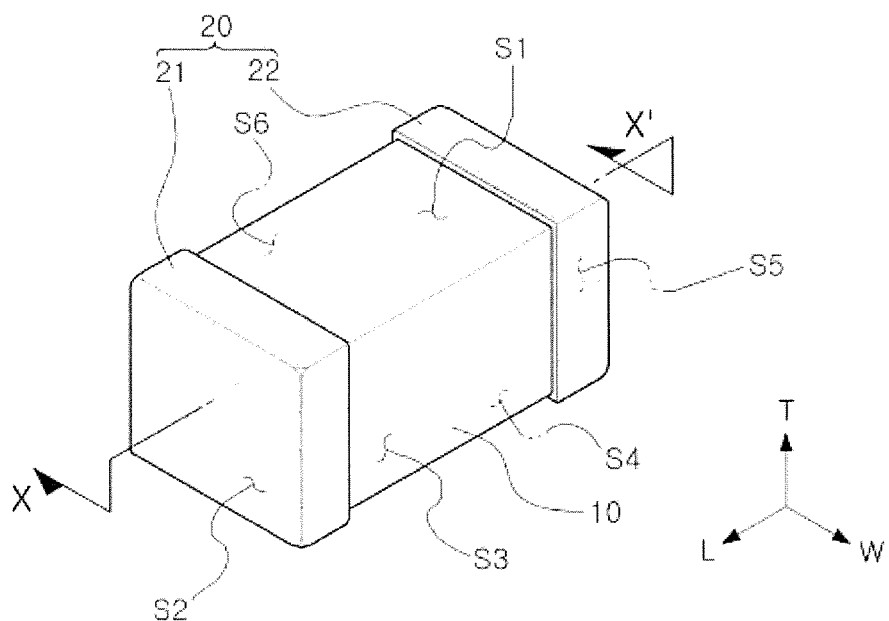
FIG. 1 is a perspective view of a multilayer ceramic electronic component according to an embodiment of the present invention.
Figure 2:
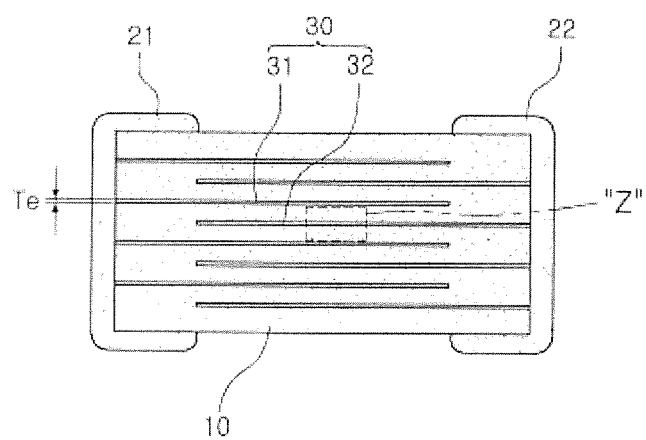
FIG. 2 is a cross-sectional view taken along line X-X' of FIG. 1.
Figure 3:
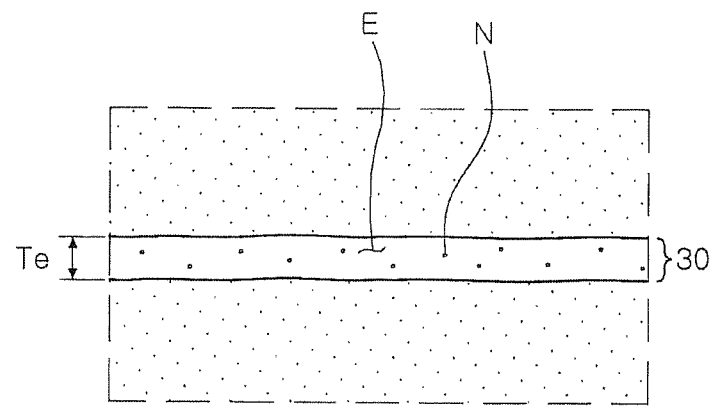
FIG. 3 is an enlarged view of area "Z" of FIG. 2.

FIG. 1 is a perspective view of a multilayer ceramic electronic component according to an embodiment of the present invention. FIG. 2 is a cross-sectional view taken along line X-X' of FIG. 1. FIG. 3 is an enlarged view of area "Z" of FIG. 2.

Referring to FIGS. 1 to 3, the multilayer ceramic electronic component according to the embodiment of the present invention may include a ceramic body 10, an internal electrode 30 formed inside the ceramic body, and an external electrode 20 formed on an outer surface of the ceramic body 10.

The ceramic body 10 may have a rectangular parallelepiped shape. An "L direction" refers to a "length direction," a "W direction" refers to a "width direction," and a "T direction" refers to a "thickness direction." Herein, the term "thickness direction" is used as having the same meaning as a lamination direction. The width may be the same as the thickness thereof. The ceramic body 10 may have an upper surface S1, a lower surface S4, side surfaces S3 and S6, and end surfaces S2 and S5.

The ceramic body 10 may include a dielectric material having high permittivity such as barium titanate or strontium titanate. Since the dielectric material includes an electric dipole, a relatively large amount of charge may be accumulated.

The external electrode 20 may be formed on external surfaces of the ceramic body 10, and in more detail, on the end surfaces S2 and S5 in a length direction (an "L" direction). The external electrode 20 may be extended to portions of the upper and lower surfaces S1 and S4 and the side surfaces S3 and S6 of the ceramic body 10. The external electrode 20 may have first and second external electrodes 21 and 22 which may have electrical currents having opposing polarities applied thereto.

The external electrode 20 may be formed of conductive metal and glass. The conductive metal may include one or more selected from a group consisting of gold (Au), silver (Ag), palladium (Pd), copper (Cu), nickel (Ni), and alloys thereof.

The internal electrode 30 may be laminated inside the ceramic body 10, but the present invention is not limited thereto and may have a rectangular shape. The internal electrode 30 may be provided as first and second internal electrodes 31 and 32, and the first and second internal electrodes 31 and 32 are drawn out in a direction opposite to each other to be connected to the first and second external electrodes 21 and 22, respectively, and therefore may be charged with opposite polarity to each other. Charges are accumulated in the first and second internal electrodes charged with the opposite polarity, which may contribute to the formation of capacitance.

The internal electrode 30 may be formed of one or more selected from a group consisting of gold, silver, copper, nickel, palladium, platinum, and alloys thereof. However, the embodiment of the present invention is not limited thereto, and therefore any material that may impart sufficient conductivity to the internal electrode 30 may be used.

In the embodiment of the present invention, the internal electrode 30 may have a plurality of non-electrode regions N formed therein.

In the cross section (L-T cross section) formed in the length and thickness directions of the ceramic body 10, a region trapped in the internal electrode 30 may refer to the non-electrode regions N and a region other than the non-electrode regions N in the internal electrode 30 may refer to an electrode region E.

A conductive paste for the internal electrode may have conductive metals such as nickel, a ceramic additive powder, other sintering aids, and the like added thereto, and regions formed by trapping the ceramic additive powder and the sintering aid in the internal electrode may be the non-electrode regions N.

The non-electrode region N may include materials such as a ceramic powder, a binder, and a solvent, other than the conductive metal used for the internal electrode and may also include voids like pores.

When the ceramic additive powder is enclosed by the conductive metal, for example, nickel powder particles, the ceramic additive powder may not be leaked outside the internal electrode during a sintering process but trapped in the internal electrode, which may form the non-electrode regions N.

An area of the non-electrode region N may be considered as a measure of a content of a material forming the non-electrode regions N. In detail, the content of the ceramic additive powder added to the internal electrode 30 may be estimated.

The non-electrode regions N may include the ceramic additive powder added to the internal electrode 30. The ceramic additive powder may move from the internal electrode 30 to the ceramic body during a firing process and may be provided as the same kind as the ceramic power forming a dielectric layer so as to prevent characteristics of the dielectric layer from deteriorating. The embodiment of the present invention is not limited thereto, but the ceramic additive powder may be, for example, a barium titanate powder.

A portion of the ceramic additive powder is pushed to the surface of the internal electrode 30, and thus is sintered along with the ceramic power forming the dielectric layer, but a portion of the ceramic additive powder may not be leaked from between metal powders until the sintering is completed and may be trapped in a grain boundary. Therefore, the ceramic additive powder may form the non-electrode region in the internal electrode 30.

The fact that the sintering shrinkage in the internal electrode 30 is suppressed by adding the ceramic additive powder to a paste for the internal electrode 30 may be described as follows.

When the ceramic additive powder is added to the internal electrode 30, the sintering initiation temperature is increased to suppress the sintering shrinkage. The reason is that the ceramic additive powder is disposed between the conductive metal particles to prevent the contact between the conductive metal particles.

The sintering process may start from necking between the conductive metal particles. Necking is a phenomenon in which portions of the conductive metal particles in contact are expanded. When the ceramic additive powder is disposed between the conductive metal particles, contact between the conductive metal particles may be limited to hinder the occurrence of necking and thus the sintering initiation temperature may be increased to correspond thereto, to suppress sintering shrinkage.

In addition, since the voids that may not be filled with the conductive metal particles may be filled with the ceramic additive powder, sintering shrinkage may be reduced.

In the embodiment of the present invention, a thickness Te of the internal electrode 30 may be from 0.1 μm to 0.55 μm. That is, 0.1 μm≤Te≤0.55 μm.

When Te<0.1 μm, the design capacity may not be implemented. When the internal electrode 30 is excessively thin, even in the case that ceramic additive powder is added, the sintering shrinkage in the internal electrode 30 may not be suppressed and the connectivity of the internal electrode 30 may not be implemented in an amount of 98% or more.

When Te>0.55 μm, since the internal electrode 30 is relatively thick, even in the case that sintering shrinkage occurs in the internal electrode, an amount of connectivity of the internal electrode 30 may be easily implemented at 98% or more and thus, design capacity may be easily realized.

In case of 0.1 μm≤Te≤0.55 μm, it may be difficult to implement an amount of connectivity of the internal electrode 30 at 98% or more and to realize design capacity. The embodiment of the present invention is to solve the problem by controlling other factors for the non-electrode regions N.

The thickness Te of the internal electrode 30 may be provided by an average value. An average value obtained by observing the cross section (L-T cross section) formed in the length and thickness directions of the ceramic body 10 using a scanning electronic microscope and measuring the thicknesses of cross sections of an internal electrode at 10 points spaced apart from one another at equidistant intervals in a width direction may be set to be the thickness Te of the internal electrode 30.

The thickness of the internal electrode 30 may be calculated as a ratio of the area of the internal electrode 30 to the actual length of the internal electrode 30 (area of internal electrode:actual length of internal electrode).

Figure 4:
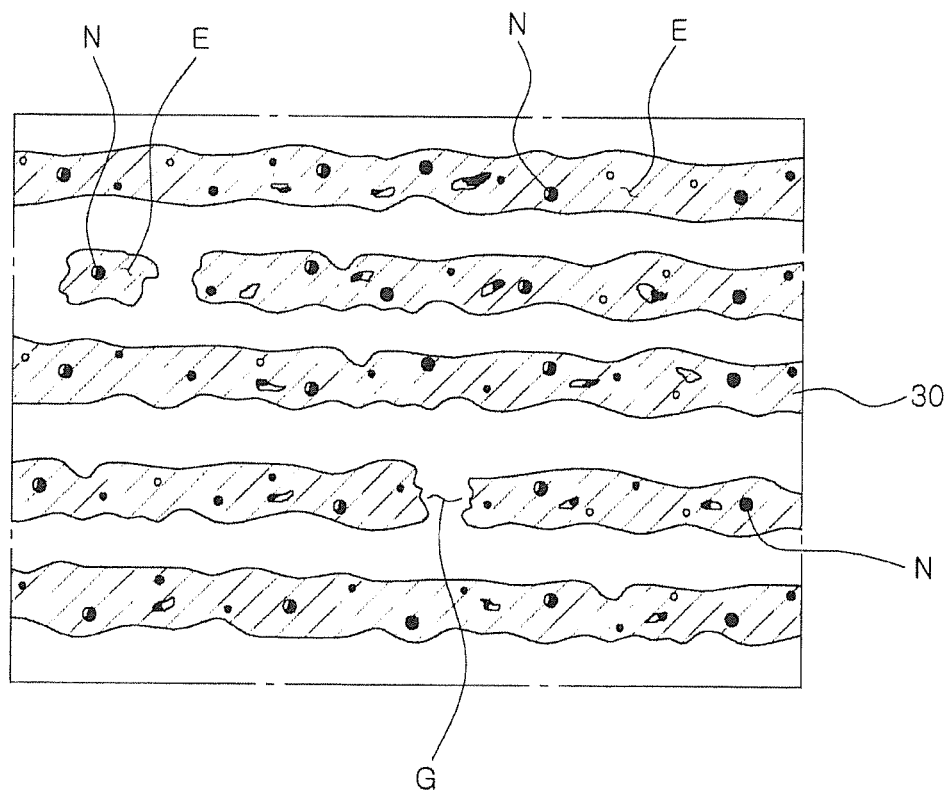
FIGS. 4 and 5 are schematic diagrams illustrating connectivity of an internal electrode.

Referring to FIG. 4, the area of the internal electrode is an area including the electrode region E and the non-electrode region N, while the actual length of the internal electrode 30 may be a length other than a gap G formed between the internal electrodes 30.

Here, the area of the internal electrode 30, an area Ae of the electrode region E, an area Ao of the non-electrode region N, and the actual length of the internal electrode 30 may be determined for a single internal electrode 30 and may be multiplied by a lamination amount, which may be provided as the entire multilayer ceramic capacitor.

In the embodiment of the present invention, a ratio (Ao:Ae) of the area Ao of the non-electrode region N to the area Ae of the electrode region E may be 3.2% to 4.5%. That is, 3.2%≤Ao:Ae≤4.5%.

The ratio (Ao:Ae) of the area Ao of the non-electrode region N to the area Ae of the electrode region E is controlled to satisfy 3.2%≤Ao:Ae≤4.5%, such that an amount of connectivity of the electrode may be implemented at 98% or more and design capacity may also be realized.

In particular, when the ratio is controlled to satisfy 3.2%≤Ao:Ae≤4.5%, cracking due to a stress does not occur, even in the case that connectivity of the electrode exceeds 99%, such that the multilayer ceramic capacitor having excellent reliability may be implemented.

When Ao:Ae<3.2%, an amount of connectivity of the electrode of 98% or more may not be realized and design capacity may not be realized.

Since the area Ao of the non-electrode region N in the internal electrode 30 is relatively small, the sintering shrinkage effect may be low and the connectivity improvement of the internal electrode 30 may be insignificant. When the connectivity of the internal electrode 30 is low, the area substantially contributing to capacitance formation in the internal electrode 30 is small, such that design capacity may not be easily realized.

When Ao:Ae>4.5%, the ceramic particle may be grown abnormally, such that an amount of breakdown voltage (BDV) may be reduced.

The fact that the area Ao of the non-electrode region N is large may indicate that a content of a material forming the non-electrode region N is increased. For example, when the same dielectric ceramic as the ceramic body is used as the ceramic additive powder, the ceramic additive powder added to the internal electrode 30 is leaked from the internal electrode 30, such that the grains in the ceramic body may be grown excessively and breakdown voltage may be reduced.

The measurement of the area Ae of the electrode region E and the area Ao of the non-electrode region N will be described with reference to FIG. 4.

The area of the internal electrode 30 is the region in which the internal electrode 30 is continuously formed and does not include a portion in which the internal electrode 30 is broken. In the area of the internal electrode 30, the gap G formed in the internal electrode 30 may be excluded. The gap G refers to pores penetrating through the internal electrode 30 and does not include pores only formed in portions of the surface of the internal electrode 30 or pores only formed in the inside of the internal electrode 30.

In an optical image, the internal electrode 30 may be differentiated from the dielectric layer, and the non-electrode region N and the electrode region E may be represented with different amounts of contrast to be differentiated from each other.

The embodiment of the present invention is not limited thereto, but the area of the internal electrode 30, the area Ae of the electrode region E, the area Ao of the non-electrode region N, and the like, may be measured using computer programs such as SigmaScan Pro.

A material included in a composition of the conductive paste may be trapped in an interface of the metal particle forming the internal electrode 30, that is, a grain boundary during the firing. In addition, pores may be formed at the interface of the metal particles during the firing process of the internal electrode 30, and the pores may be formed in the internal electrode 30 in a form in which the pores are contained within the internal electrode 30.

When a particle size ratio of the ceramic additive powder is controlled so that the ceramic additive powder is dispersed between the metal powders, the sintering of the metal powder may be suppressed to a temperature of about 1000° C. or more. The sintering of the metal powder is significantly suppressed to a predetermined temperature and the sintering of the ceramic powder forming the dielectric layer may start. When the densification of the ceramic powder forming the dielectric layer is performed, the densification of the internal electrode 30 starts and the sintering may be performed rapidly.

The ceramic additive powder may delay the initiation of sintering shrinkage in the metal powder and may suppress sintering shrinkage of the metal powder. The ceramic additive powder with the controlled particle size ratio may prevent contact between the metal powder during sintering shrinkage in the metal powder to suppress grain growth in the metal powder and an agglomeration phenomenon of the internal electrode 30.

The non-electrode region N is evenly distributed in the internal electrode 30 and the size of the non-electrode region N may be relatively small.

Evenly dispersing the non-electrode region N in the internal electrode 30 may indicate that a function of increasing the shrinkage starting temperature of the internal electrode 30 is effectively performed.

The non-electrode region N may be evenly distributed within the internal electrode 30 at a relatively small size. This aspect may be determined by the following factors.

A first factor is the added amount of the ceramic additive powder. The ratio of the area Ao of the non-electrode region N to the area Ae of the electrode region E may be controlled by controlling the added amount of the ceramic additive powder. When the content of the ceramic additive powder is increased, the area Ao of the non-electrode region N may be relatively large, and when the content of the ceramic additive powder is reduced, the area Ao of the non-electrode region N may be relatively small.

A second factor is the maximum size of the particles of the ceramic additive powder. The smaller the particle size of the ceramic additive powder is, the smaller the size of the non-electrode region N formed in the internal electrode may be.

A third factor is the dispersion of the ceramic additive powder within the paste. As the material forming the non-electrode region N, that is, the ceramic additive powder, may be evenly dispersed within the paste for the internal electrode, the non-electrode region N may evenly be dispersed within the internal electrode 30. The dispersion of the ceramic additive powder within the paste may be improved by controlling additives such as a dispersant and a milling time during the process of preparing the conductive paste.

A fourth factor is the particle size of the ceramic additive powder. In detail, the fourth factor is the ratio of the particle size of the ceramic additive powder to the size of the conductive metal particle. A ratio (Ds:Dn) of an average particle size (D50) (Ds) of the ceramic additive powder to an average particle size (D50) (Dn) of the conductive metal particle may be 1:12 or less, which may use a fine ceramic additive powder to suppress initial sintering shrinkage in the internal electrode 30.

A fifth factor is a heating rate during sintering. When the heating rate is increased during sintering, the movable time of the ceramic additive powder during the sintering process is relatively short, such that the ceramic additive powder may remain at an initial position as it is. Therefore, when the ceramic additive powder is well dispersed, the ceramic additive powder may be evenly dispersed within the internal electrode 30 even after the sintering.

On the other hand, when the heating rate is reduced during sintering, the movable time of the ceramic additive powder is enough to agglomerate the ceramic additive powder particles, such that the dispersion thereof may be reduced.

According to the embodiment of the present invention, when a ratio of a length of a portion actually formed with the internal electrode 30 to the entire length of the internal electrode 30 is defined by connectivity C of the internal electrode, the connectivity C may satisfy 98%≤C≤99.99%.

Figure 5:
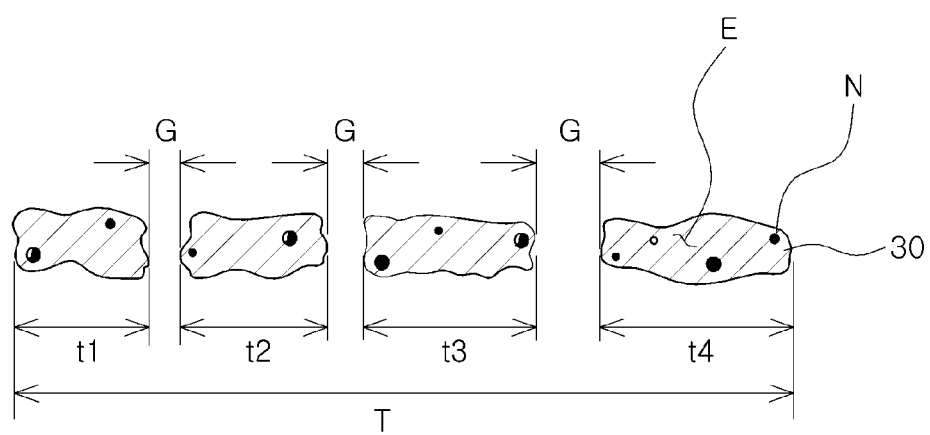

Referring to FIGS. 4 and 5, the connectivity of the internal electrode 30 may be defined by the ratio of the actual length of the portion formed with the internal electrode 30 to the entire length of the internal electrode 30 (actual length of portion formed with internal electrode:entire length of internal electrode).

The entire length of the internal electrode 30 and the length of the portion actually formed with the internal electrode 30 may be measured using the optical image obtained by scanning a section of the multilayer ceramic capacitor as described above.

In more detail, in an image obtained by scanning a cross section in a length direction cut in a central portion of a ceramic element in a width direction thereof, the ratio of the actual length of the portion formed with the internal electrode to the entire length of the internal electrode may be measured.

According to the embodiment of the present invention, the entire length of the internal electrode 30 may refer to a length including the gap G formed the internal electrode 30 in a single internal electrode, and the actual length of the portion formed with the internal electrode 30 may refer to a length excluding the gap G formed in the internal electrode 30 with regard to a single internal electrode 30. As described above, the gap G refers to pores penetrating through the internal electrode 30 and does not include pores only formed in portions of the surface of the internal electrode 30 or pores only formed in the inside of the internal electrode 30.

As illustrated in FIG. 5, the entire length of the internal electrode 30 and the actual length of the internal electrode 30 may be measured by taking a portion of the optical image. In more detail, when the entire length of the internal electrode 30 including pores at some points of the internal electrode 30 is defined by T and the actual length of the portion formed with the internal electrode 30 is defined by t1, t2, t3, . . . , and tn, the connectivity of the internal electrode 30 may be represented by (t1+t2+t3+t4+tn):T. FIG. 5 illustrates that the portion formed with the internal electrode 30 is represented by t1, t2, t3, and t4, but the number of actually formed electrode portions is not particularly limited.

The actual length of the internal electrode 30 may be measured by a value obtained by subtracting the length of the gap G from the entire length T of the internal electrode 30.

When C<98%, it may be difficult to realize design capacity.

When the connectivity of the internal electrode 30 is large, the internal electrode 30 is formed with almost no voids in the middle of the internal electrode 30, thereby securing relatively high capacitance. To the contrary, when the connectivity of the internal electrode 30 is reduced, an effective surface forming capacitance is reduced, ineffective in forming capacitance.

When C>99.99%, a stress relaxation effect is insignificant, and thus cracking may occur.

The internal electrode 30 may be shrunk in a thickness direction during the sintering process, such that through holes may be formed therein in a thickness direction. The through holes formed in the internal electrode 30 serve to relax stress within the ceramic body. When the connectivity of the internal electrode 30 is excessively high, the stress relaxation effect due to the through hole may be significantly low, such that cracking may occur.

According to another embodiment of the present invention, a method of manufacturing a multilayer ceramic electronic component includes: preparing the conductive paste including the conductive metal powder and the ceramic additive powder and having the ratio of the average particle size of the ceramic additive powder to the average particle size of the conductive metal powder set to be 1:12 or less; forming the internal electrode 30 on a ceramic green sheet using the conductive paste; and laminating a plurality of the ceramic green sheets formed with the internal electrode 30.

First, the conductive metal powder for imparting conductivity to the external electrode 20, a glass powder for densifying the external electrode 20, ethanol as an organic solvent, and polyvinylbutyral as a binder, and the like are mixed, and are then subjected to ball milling to prepare the paste for the external electrode 20.

The composition of the conductive paste forming the internal electrode 30 may further include a binder, a solvent, further additives, and the like.

The binder is not limited thereto, but polyvinylbutyral, a cellulose-based resin, and the like, may be used. The polyvinylbutyral may have strong adhesion characteristics to allow for bonding strength between the conductive paste and the ceramic green sheet to be improved.

The cellulose-based resin has a chair type structure, and therefore has rapid recovery characteristics due to elasticity when deformation occurs therein. A flat printed surface may be secured by including the cellulose-based resin.

The solvent is not particularly limited, but, for example, butylcarbitol, kerosene, or a terpineol-based solvent may be used. A type of terpineol-based solvent is not limited, but dehydro terpineol, dehydro terpinyl acetate, and the like may be used.

Next, the conductive paste including the conductive metal powder and the ceramic additive powder and having the ratio of the average particle size of the ceramic additive powder to the average particle size of the conductive metal powder set to be 1:12 or less may be prepared.

When the ratio of the particle size of the ceramic additive powder to the particle size of the metal powder (ceramic additive powder:metal powder) exceeds 1:12, the ceramic additive powder may be difficult to efficiently suppress the shrinkage of the metal particle.

The particle size of the ceramic additive powder is smaller than the particle size of the metal powder, such that the ceramic additive powder may be distributed between the metal powders.

The ceramic additive powder is disposed between the metal particles during the sintering of the metal particles, such that the growth of metal particles therein may be suppressed. On the other hand, the ceramic additive powder having particles smaller than the size of the pores formed during the sintering of the metal particle is difficult to limit the contact of the metal particle, and thus may be difficult to perform a role of hindering the growth of the metal particle.

The particle size of the conductive metal powder and the ceramic additive powder may be measured as an average particle size. In detail, the particle size of the conductive metal powder and the ceramic additive powder may be measured by a method of measuring an average particle size that is defined by the American Society for Testing Materials (ASTM).

Herein, the intended particle size is D50, but particles larger or smaller than D50 size may be present. The conductive metal particle having a relatively small size may first be sintered in the early stage of the sintering, such that the initial shrinkage may incur. In order to suppress the initial shrinkage of the internal electrode 30, the fine ceramic additive powder may be used.

In using the fine ceramic additive powder, it may be important to disperse the fine ceramic additive powder properly. The reason is that when the ceramic additive powder is agglomerated, the fine ceramic additive powder may not be used. The fine ceramic additive powder may be dispersed properly by using the dispersant, and the like, or controlling the dispersion condition, and the like.

The dispersed degree may be measured from the distribution of the ceramic additive powder within the internal electrode 30. In detail, as the non-electrode region N, that is, the ceramic additive powder may be evenly distributed at a relatively small size, it may be determined that the dispersion is made well. As a lot of non-electrode regions N are evenly distributed, the effect of the sintering shrinkage suppression of the internal electrode 30 may be larger and the connectivity of the internal electrode 30 may be improved.

Next, the internal electrode 30 may be formed on the ceramic green sheet using the conductive paste.

The conductive paste may be formed on the ceramic green sheet using a method such as screen printing, or the like.

Next, a ceramic green laminate is prepared by laminating a plurality of the ceramic green sheets on which the internal electrode 30 is formed and is cut to manufacture green chips. A sintered chip is manufactured by sintering the green chip and the external electrode 20 is formed on an outer surface of the sintered chip to complete the multilayer ceramic electronic component.

When a base metal is used in the internal electrode 30, since the internal electrode 30 may be oxidized when the firing is performed in an air atmosphere, the firing may be performed under a reduction atmosphere.

Further, a nickel plating layer and a tinplating layer may be formed on the external electrode 20 to allow for ease of mounting thereof.

In the embodiment of the present invention, a ratio of a weight of the ceramic additive powder to a weight of the conductive metal may be 24.3% or less.

When the weight of the ceramic additive powder to the weight of the conductive metal is 24.3% or less, the ratio Ao:Ae of the area Ao of the non-electrode region N to the area Ae of the electrode region E may be implemented as 3.2% to 4.5%. The reason is that the area occupied by the non-electrode region N may be controlled by controlling the added amount of the ceramic additive powder.

The conductive metal may include nickel.

The ceramic additive powder may be a ceramic additive and the ceramic additive powder may include barium titanate or strontium titanate.

The conductive metal, the ceramic additive powder, and the like are the same as those described in the foregoing embodiment.

Hereinafter, the present invention will be described in detail with reference to the Inventive Examples and the Comparative Examples.

The multilayer ceramic capacitor according to Inventive Example and Comparative Example is prepared according to the following method.

A ceramic slurry was prepared by mixing barium titanate, ethanol as an organic solvent, and polyvinylbutyral as a binder and performing ball milling thereon, and the ceramic green sheet was manufactured with the ceramic slurry.

The internal electrode 30 was formed on the ceramic green sheet by printing conductive paste for the internal electrode 30 containing nickel on the ceramic green sheet, and the green laminate formed by laminating the internal electrodes was subjected to isostatic pressing at a pressure of 1000 kgf/cm2 at 85° C.

The green chip was manufactured by cutting the pressed green laminate, the cut green chip was subjected to a debinder process in which the green chip was maintained at 230° C. for 60 hours under the air atmosphere, and then the green chip was sintered at 1000° C. to manufacture a sintered chip. The sintering is performed under the reduction atmosphere to prevent the internal electrode 30 from being oxidized and the reduction atmosphere was set to be $10^{-11}$ to $10^{-10}$ atm lower than a Ni:NiO equilibrium oxygen partial pressure.

The external electrode 20 was formed on an external surface the sintered chip using the paste for the external electrode 20 including the copper powder and the glass powder, and the nickel plating layer and the tin plating layer were formed on the external electrode 20 by electroplating.

The multilayer ceramic capacitor having a 0603 size was manufactured according to the above-described method. The 0603 size may have a length and a width of 0.6 μm±0.1 μm and 0.3 μm±0.1 μm, respectively. The characteristics of the multilayer ceramic capacitor were evaluated as follows.

When the design capacity exceeded 98.5% of a target value thereof, capacity characteristics were determined to be good (o), and when the design capacity was less than 98.5% of the target value thereof, capacity characteristics were determined to be poor (x).

Breakdown voltage (BDV) was evaluated by applying DC voltage at a speed of 1.0 V/sec, and based on the breakdown voltage of 60V, when dielectric breakdown did not occur, breakdown voltage was determined to be good (o), and when the dielectric breakdown occurred, breakdown voltage was determined to be poor (x).

The reliability of the chip was evaluated based on whether cracking occurred during polishing and analyzing of the chip, and when cracking occurred, the chip was determined to be poor (x), while when cracking did not occur, the chip was determined to be good (o).

TABLE 1

| | Te (μm) | Ao:Ae (%) | Electrode Connectivity (%) | Capacity Characteristics (Capacity implemented as 98.5% or more?) | BDV | Reliability Evaluation |
|---|---|---|---|---|---|---|
| 1 | 0.102 | 4.12 | 98.1 | o | o | o |
| 2* | 0.113 | 2.97 | 97.5 | x | o | o |
| 3 | 0.113 | 3.35 | 98.2 | o | o | o |
| 4* | 0.237 | 4.52 | 98.2 | o | x | o |
| 5 | 0.245 | 3.47 | 98.3 | o | o | o |
| 6 | 0.258 | 3.85 | 98.6 | o | o | o |
| 7* | 0.276 | 2.71 | 96.3 | x | o | o |
| 8 | 0.284 | 3.41 | 98.2 | o | o | o |
| 9* | 0.334 | 4.85 | 98.9 | o | x | o |
| 10* | 0.345 | 3.02 | 99.1 | o | o | x |
| 11 | 0.378 | 3.23 | 99.2 | o | o | o |
| 12* | 0.412 | 2.89 | 96.7 | x | o | o |
| 13 | 0.434 | 4.17 | 99.2 | o | o | o |
| 14* | 0.465 | 4.58 | 99.6 | o | x | o |
| 15 | 0.487 | 3.45 | 98.9 | o | o | o |
| 16* | 0.512 | 2.98 | 98.3 | o | o | x |
| 17* | 0.523 | 3.19 | 99.1 | o | o | x |
| 18* | 0.527 | 2.48 | 95.2 | x | o | o |
| 19 | 0.530 | 4.50 | 99.9 | o | o | o |
| 20 | 0.550 | 3.25 | 98.1 | o | o | o |

*Comparative Example

In Table 1, Te is the thickness of the internal electrode 30 and Ao:Ae is the ratio of the area Ao of the non-electrode region N to the area Ae of the electrode region E in the internal electrode 30.

Referring to Table 1, in the case in which respective samples 2, 7, 12, and 18, Comparative Examples, respectively had Te of 0.113 μm, 0.276 μm, 0.412 μm, and 0.527 μm, Ao:Ae of 2.97%, 2.71%, 2.89%, and 2.48%, and electrode connectivity of 97.5%, 96.3%, 96.7%, and 95.2%; BDV characteristics were good, and cracking did not occur, but design capacity was not implemented. The reason is that the ratio of the non-electrode region N to the electrode region E is small and thus the electrode connectivity is not implemented as 98% or more.

In the case in which respective samples 4, 9, and 14, Comparative Examples, respectively had Te of 0.237 μm, 0.334 μm, and 0.465 μm, Ao:Ae of 4.52%, 4.85%, and 4.58%, and electrode connectivity of 98.2%, 98.9%, and 99.6%; the design capacity was implemented, and the cracking did not occur, but breakdown voltage characteristics were poor. The reason is that the ratio occupied by the non-electrode region N is relatively large and thus the ceramic additive powder present within the internal electrode 30 is leaked to the dielectric body and the grains of the dielectric layer interposed between the internal electrodes 31 and 32 are grown abnormally.

In the case in which samples 10, 16, and 17, Comparative Examples, respectively had Te of 0.345 μm, 0.512 μm, and 0.523 μm, Ao:Ae of 3.02%, 2.98%, and 3.19%, and electrode connectivity of 99.1%, 98.3%, and 99.1%; design capacity was implemented, and BDV characteristics were good, but cracking occurred. When the ratio of the area Ao of the non-electrode region N to the area Ae of the electrode region E does not satisfy the numerical range of the present invention, the stress relaxation effect is significantly low, such that cracking may occur.

Unlike the foregoing Comparative Examples, in the case in which samples 1, 3, 5, 6, 8, 11, 13, 15, 19, and 20, Inventive Examples, respectively had 0.1 μm≤Te≤0.55 μm, 3.2% Ao:Ae≤4.5%, and 98%≤C≤99.99%, the design capacity was implemented, BDV characteristics were good, and cracking did not occur.

As set forth above, according to the embodiment of the present invention, an amount of connectivity of 98% or more and design capacity may be realized, and dielectric breakdown, as well as the occurrence of cracking may be prevented, by controlling the size of the barium titanate ceramic additive powder and the ratio of the size and the added amount of the nickel powder used in a paste for the internal electrode and the heating rate during sintering to control the distribution of the region of the barium titanate ceramic additive powder trapped in the internal electrode.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body; and
   an internal electrode formed in the ceramic body and having a plurality of non-electrode regions formed therein,
   wherein in a cross section formed in length and thickness directions of the ceramic body, when a thickness of the internal electrode is Te, an area of the internal electrode is Ae, and an area of the plurality of non-electrode regions is Ao, 0.1 μm≤Te≤0.55 μm and 3.2%≤Ao:Ae≤4.5% are satisfied, and
   when connectivity C of the internal electrode is defined as a ratio of a length of actually formed portions of the internal electrode to an overall length of the internal electrode, 98.1%≤C≤99.99% is satisfied.

2. The multilayer ceramic electronic component of claim 1, wherein the thickness Te of the internal electrode is an average thickness of the internal electrode.

3. The multilayer ceramic electronic component of claim 1, wherein the non-electrode region includes a ceramic additive powder.

4. The multilayer ceramic electronic component of claim 3, wherein the ceramic additive powder is the same material as that forming the ceramic body.

5. The multilayer ceramic electronic component of claim 3, wherein the non-electrode region further includes pores.

6. A method of manufacturing a multilayer ceramic electronic component, comprising:

preparing a conductive paste including a conductive metal powder and a ceramic additive powder and having a ratio of an average particle size between the ceramic additive powder and the conductive metal powder being 1:12 or less;

forming an internal electrode on a ceramic green sheet using the conductive paste;

laminating a plurality of the ceramic green sheets on which the internal electrode is formed; and forming a ceramic body by sintering a laminate in which the ceramic green sheets are laminated, wherein the ceramic body includes the internal electrode having a plurality of non-electrode regions formed therein, and in a cross section formed in length and thickness directions of the ceramic body, when an area of the internal electrode is Ae and an area of the plurality of non-electrode regions is Ao, $3.2\% \leq Ao:Ae \leq 4.5\%$ is satisfied, and when connectivity C of the internal electrode is defined as a ratio of a length of actually formed portions of the internal electrode to an overall length of the internal electrode, $98.1\% \leq C \leq 99.99\%$ is satisfied.

7. The method of claim 6, wherein a ratio of a weight of the ceramic additive powder to a weight of the conductive metal is 24.3% or less.

8. The method of claim 6, wherein the ceramic additive powder includes barium titanate or strontium titanate.

9. The method of claim 6, wherein a thickness Te of the internal electrode satisfies $0.1\ \mu m \leq Te \leq 0.55\ \mu m$.

10. The method of claim 9, wherein the thickness Te of the internal electrode is an average thickness of the internal electrode.

* * * * *